United States Patent [19]

Tsai et al.

[11] Patent Number: 4,690,170
[45] Date of Patent: Sep. 1, 1987

[54] SAFETY GAS VALVE WITH TIMER

[76] Inventors: Tzong D. Tsai, No. 143, Hsin Sheng Street, Feng Shan City, Kaohsiung; Tsang J. Tsai, No. 233, Sec. 2, Ta Tung Road, Tainan, both of Taiwan

[21] Appl. No.: 888,339

[22] Filed: Jul. 23, 1986

[51] Int. Cl.⁴ .............................................. F16K 24/01
[52] U.S. Cl. ........................ 137/624.11; 137/614.17; 137/460
[58] Field of Search ............... 137/624.11, 624.12, 137/624.21, 624.22, 460, 614.17

[56] References Cited
U.S. PATENT DOCUMENTS

| | | | |
|---|---|---|---|
| 392,921 | 11/1888 | Howard | 137/624.4 |
| 849,002 | 4/1907 | Denny | 137/624.11 |
| 4,257,448 | 3/1951 | Shiu | 137/460 |
| 4,373,548 | 2/1983 | Chou | 137/460 |

Primary Examiner—Alan Cohan
Attorney, Agent, or Firm—Morton J. Rosenberg

[57] ABSTRACT

This invention relates to a safety gas valve with timer, and in particular to one combining a valve and a timer together, whereby it can be set to close automatically at predetermined time and can be used to detect gas leakage.

3 Claims, 5 Drawing Figures 4,690,170

SAFETY GAS VALVE WITH TIMER

BACKGROUND OF THE INVENTION

Various types of safety valves for gas tank have been constructed in the past for controlling the flow passing therethrough. However, they cannot be used to measure the flow rate nor detect gas leakage. Further, they must be closed by hand thereby causing much inconvenience and wasting energy when the user forgets to close them.

It is, therefore, an object of the present invention to provide an improved safety gas valve.

SUMMARY

It is the primary object of the present invention to provide a safety gas valve which is provided with a timer.

It is another object of the present invention to provide a safety gas valve with timer which is simple in construction.

It is still another object of the present invention to provide a safety gas valve with timer which is easy to operate.

It is still another object of the present invention to provide a safety gas valve with timer which is provided with a flow rate meter.

It is a further object of the present invention to provide a safety gas valve with timer which will give signals when the timer stops allowing the passage of gas.

Other objects, merits and features of the present invention will be obtained by those having ordinary skill in the art when the following detailed description of the preferred embodiment contemplated for practicing the invention has been read in conjunction with the accompanying drawings, wherein like numerals refer to like or similar parts and in which:

DETAILED DESCRIPTION OF THE PREFERRED EMBODIMENT

Figure 1:
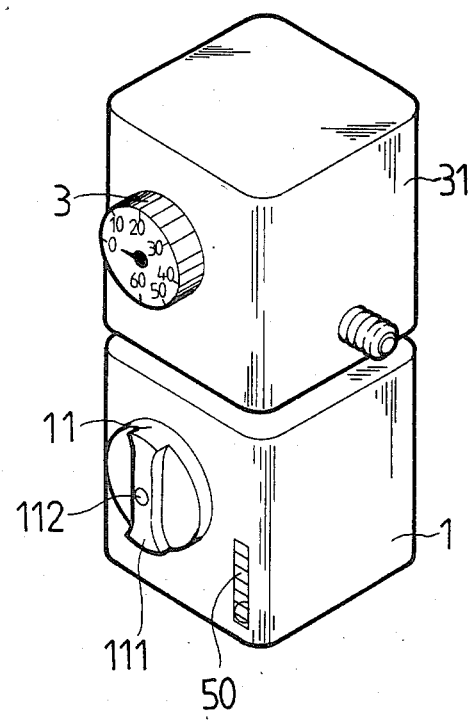
FIG. 1 is a perspective view of the present invention.
Figure 2:
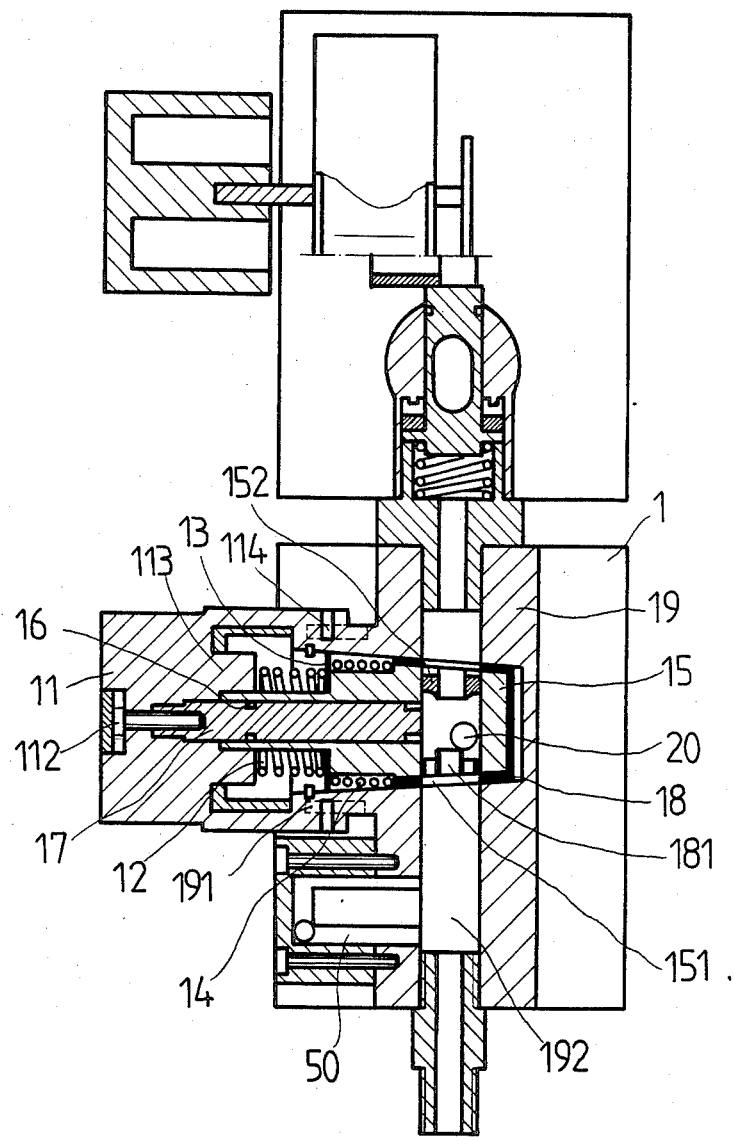
FIG. 2 is a cross-sectional view of the present invention.

With reference to the drawings and in particular to FIGS. 1 and 2 thereof, the present invention comprises a safety valve 1 and a timer 3. The safety valve 1 has a knob 11, a compressed spring 12, a stop packing 13, a positioning spring 14, a plug 15, an oil seal 16, a push rod 17, a rubber cup 18, and a valve body 19. As shown in FIG. 2, the knob 11 is shaped as a cup provided on the top with a rib 111. The center of the rib 111 has a threaded hole for engaging with a screw 112. The screw 112 extends through the knob 11 to engage with the push rod 17. The interior of the knob 11 is formed with an annular projection 113 having a recess for receiving the end of the plug 15 so that the knob 11 will rotate in unison with the plug 15. The plug 15 has a longitudinal through hole for receiving the push rod 17. Furthermore, the plug 15 has a tapered right end (with respect to FIG. 2) on which there are two aligned exits 151 each having a ferrule 152 therein.

The rubber cup 18 is adapted to the tapered right end of the plug 15 and having two holes 181 in alignment with the exits 151 of the plug 15. As the rubber cup 18 is put on to the tapered end of the plug 15 and located within the valve body 19, the rubber cup 18 will be able to rotate in unison with the plug 15. The rubber cup 18 is mainly used for sealing.

The valve body 19 is hollow in structure and can just accomodate the component parts. On the circumferential surface of the valve body 19 there is a Z-like slot 191 capable of accomodating a positioning pin 114 mounted in the knob 11. The lower portion of the valve body 19 is provided with a through hole 192 having the same diameter as the hole 181 of the rubber cup 18. The through hole 192 is formed at both ends with internal threads.

In assembly a ball 20 is first put into the through hole provided at the lower portion of the plug 15. Then, the rubber cup 18 is put on to the tapered end of the plug 15 and disposed within the valve body 19. Thereafter, put the oil seal 16 on to the push rod 17 and insert the push rod 17 into the longitudinal through hole of the plug 15. Afterwards, the positioning spring 14 is mounted coaxially with the central portion of the plug 15. A stop packing 13 is then put on to the positioning spring 14 and its rim is embedded into the valve body 19. Then, the compressed spring 12 is put on to the free end of the plug 15, pressing against the stop packing 13. The screw 112 extends through the knob 11 to engage with the push rod 17. Lastly, the positioning pin 114 is mounted in the knob 11 and extends into the slot 191 of the valve body 19.

From the above, it is understood that the present invention has the following characteristics:

1. The positioning spring 4 will force the plug 15 to closely engage with the rubber cup 18 and so the rubber cup 18 will have effective sealing function.

2. The ball 20 is always located between the two ferrules 152 at the exits 151 of the plug 15.

3. The knob 11 can be pressed in unison with the push rod 17 to press the ball 20.

4. The knob 11 are rotated in unison with the plug 15 and the rubber cup 18 so as to control the connection between the exits 151 and the valve body 19.

Normally, the safety gas valve is at the closed condition. At that time, the knob 11 will be lifted by the compressed spring 12 to the upper end of the slot 191, the bottom end of the push rod 17 is not in contact with the ball 20, and the exits 151 are not in communication with the through hole 192.

When desired to supply gas, simply press the knob 11 and then turn the knob 11 along the slot 191 to the leftmost end with respect to FIG. 1. Meanwhile, the exits 151 will communicate with the through hole 192 thereby allowing the passage of the gas.

When the gas piping is damaged, there will be a large amount of gas leakage thereby producing transient vacuum and therefore, causing the ball 20 to press on the upper ferrule 152. As a result, the exits 151 will be closed and gas leakage will be stopped. When desired to supply gas after maintenance, press the knob 11 to lower the push rod 17 to separate the ball 20 from the upper ferrule 152. In the meantime, the pressure is balanced, the vaccum disappears, the ball 20 will not block the ferrule 152, and gas can pass therethrough again.

Figure 3:
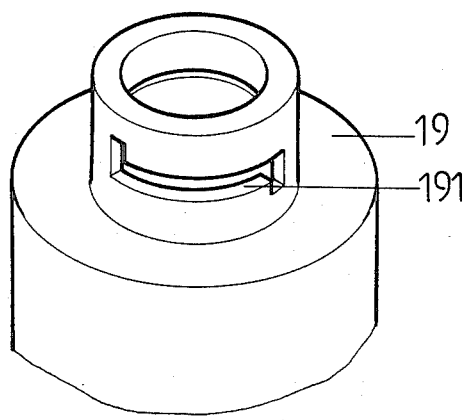
FIG. 3 shows the slot of the valve body.
Figure 4:
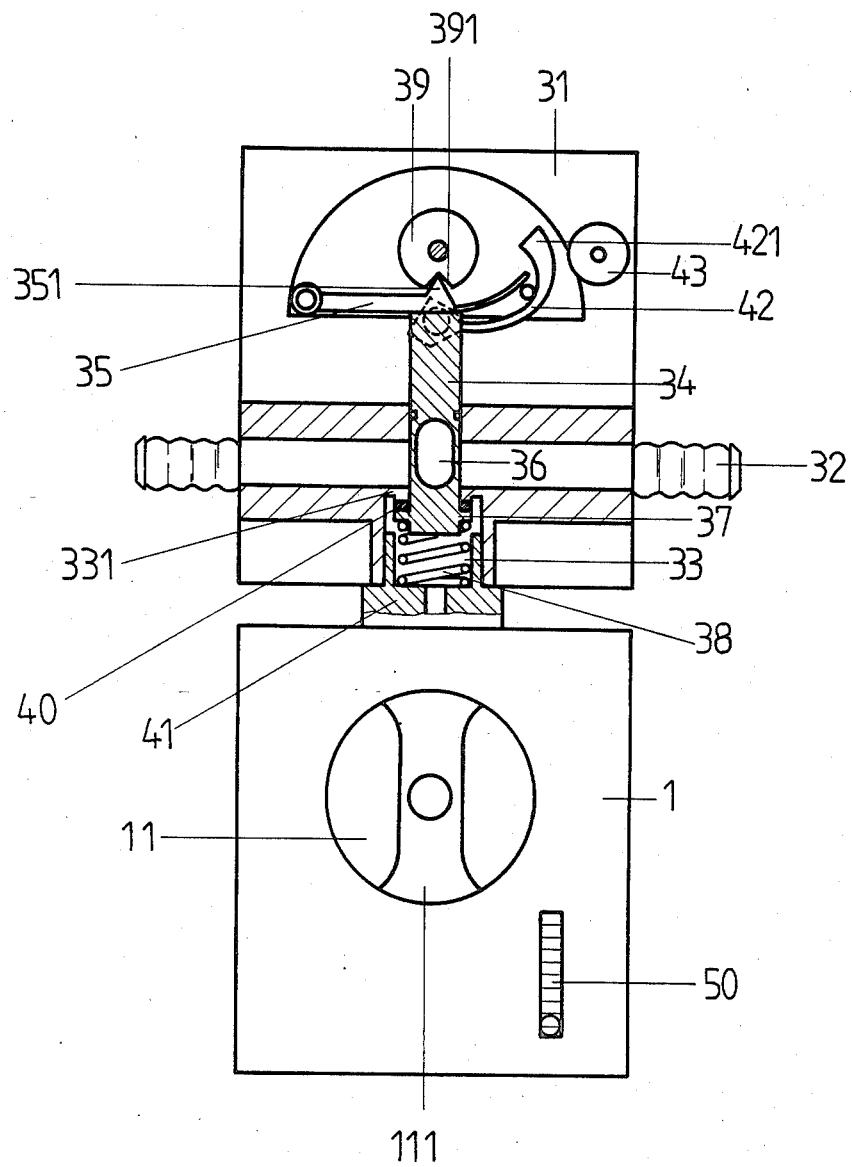
FIG. 4 shows the closed state of the present invention.

Referring to FIGS. 3 and 4, the timer 3 is disposed within a block 31. The block 3 has a gas exit 32 in both sides. In the lower part of the block 31 is formed a recess 33 having a passage in communication with the timer 3. A lift rod 34 is disposed within the passage, with its top end bearing against a hitting rod 42 of the timer 3. The lift rod 34 has an opening 36 at its central portion and an annular projection 37 at its lower portion. In assembly, a rubber packing 40 is first put on to the annular projection 37 of the lift rod 34. Then, a spring 38 is engaged with the bottom end of the lift rod 34. Thereafter, the recess 33 is put on to a connector 41 thereby confining the spring 38 into the recess 33 and therefore, urging the lift rod 34 against the hitting rod 42 of the timer 3.

Figure 5:
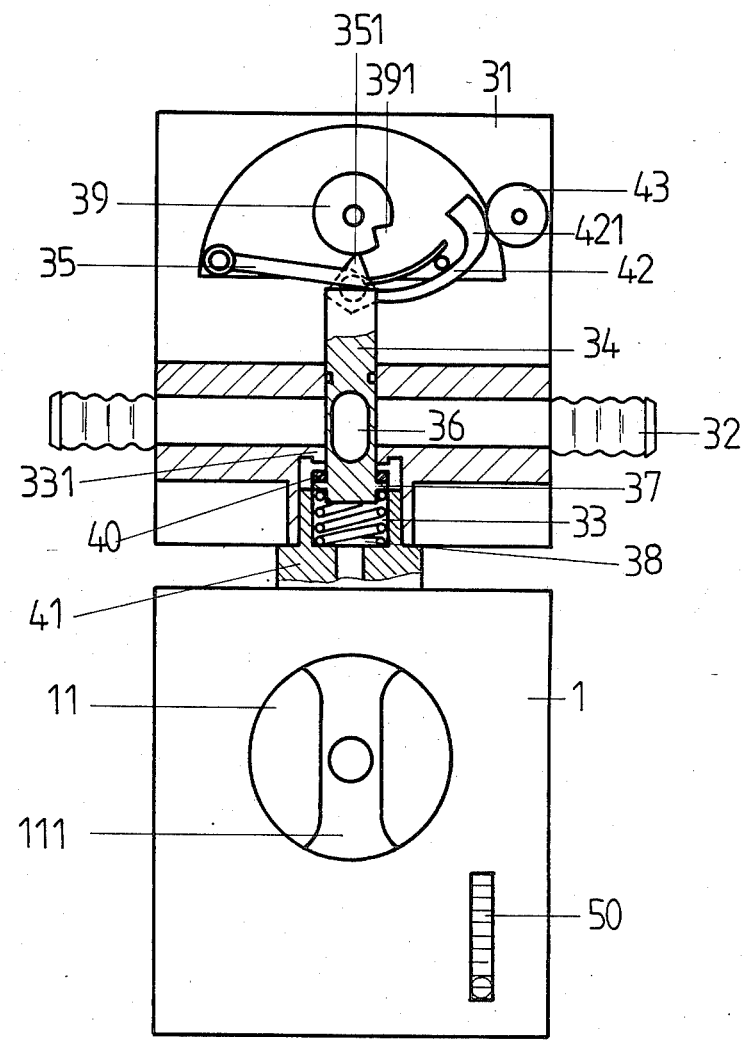
FIG. 5 shows the open state of the present invention.

The timer 3 mainly comprises a set of timing gears, a notched disc 39, an actuating arm 35 and a hitting rod 42. When the timer 3 is at its zero point, a protuberance 351 of the actuating arm 35 will go into the notch 391 of the notched disc 39. Meanwhile, the lower edge 352 of the actuating arm 35 does not urge against the hitting rod 42. Accordingly, the lift rod 34 is lifted by the spring 38 to its upper position. As the lift rod 34 is lifted, the rubber packing 40 will be lifted to urge against the top of the recess 33, blocking the gas passage. When the timer 3 is set, the edge of the notched disc 39 will force the protuberancce 351 of the actuating arm 35 to move downwards thereby causing the lower edge 352 of the actuating arm 35 to press the hitting rod 42 downwards (as show in FIG. 5). At that time, the rubber packing 40 will be separated from the top 331 of the recess 33 and gas may flow through the center hole of the connector 41 and the recess 33 to the gas exits 32. When the timer 3 returns to its zero point, the protuberance 351 of the actuating arm 35 will go into the notcch 391 of the notched disc 39 again.

It should be noted that when the protuberance 351 of the actuating arm 35 returns to fall into the notch 391 of the notched disc 39, the end 421 of the hitting rod 42 will be oscillated to strike abell 43. Hence, the user will be given a signal when the time is up.

Referring to FIG. 2 again, a pitot tube 50 is mounted into the safety valve 1 and operatively connected with the vertical through hole 192 of the valve body 19 so that the flow rate of the gas can be measured.

Although this invention has been described with a certain degree of particularity, it is understood that the present disclosure is made by way of example only and that numerous changes in the detail of construction and the combination and arrangement of parts may be resorted to without departing from the scope and spirit of the invention as hereinafter claimed.

We claim:

1. A safety gas valve having a timer comprising:
 a valve;
 a timer mounted on said valve, said valve including;
 a valve body provided with a slot, a tapered recess at the central portion thereof and a vertical through hole;
 a rubber cup disposed within the recess of said valve body, said rubber cup having two holes in alignment with said vertical through hole;
 a plug having a tapered end received in the recess of said valve body, said tapered end having a vertical through hole aligned with the vertical through hole of said valve body, each end of the through hole of said plug being provided with a ferrule;
 a ball disposed into said through hole of said plug;
 a push rod inserted into said plug for separating said ball from said ferrule;
 a positioning spring located on said plug for biasing said plug into said valve body;
 a knob threadedly engaged with said push rod;
 a compressed spring in contact with said positioning spring for biasing said knob away from said valve body;
 a packing disposed between said compressed spring and the positioning spring and rigidly mounted within said plug;
 a pitot tube in communication with the vertical through hole of said valve body;
 said timer including,
 a set of timing gears;
 a notched disc operatively connected with said set of timing gears and pivoted at center thereof;
 an actuating arm pivoted at one end, said actuating arm having a protuberance constantly in contact with circumference of said notched disc;
 a hitting rod operatively connected with said set of timing gears so as to hit a bell when set time of the timer is up;
 a connector connecting said valve to said timer;
 a spring-loaded lift rod fitted into said connector, said spring-loaded lift rod having a hole in communication with two gas exits so that only when the lift rod is pressed downwards by said actuating arm will the hole of the lift rod be in communication with the valve.

2. A safety gas valve having a timer as claimed in claim 1, wherein said valve body is provided with a Z-like slot on the circumferential surface thereof.

3. A safety gas valve having a timer as claimed in claim 1, wherein said hitting rod is urged against by said actuating arm whereby said hitting rod will hit a bell when moved up or down.

* * * * *